Figure 1:
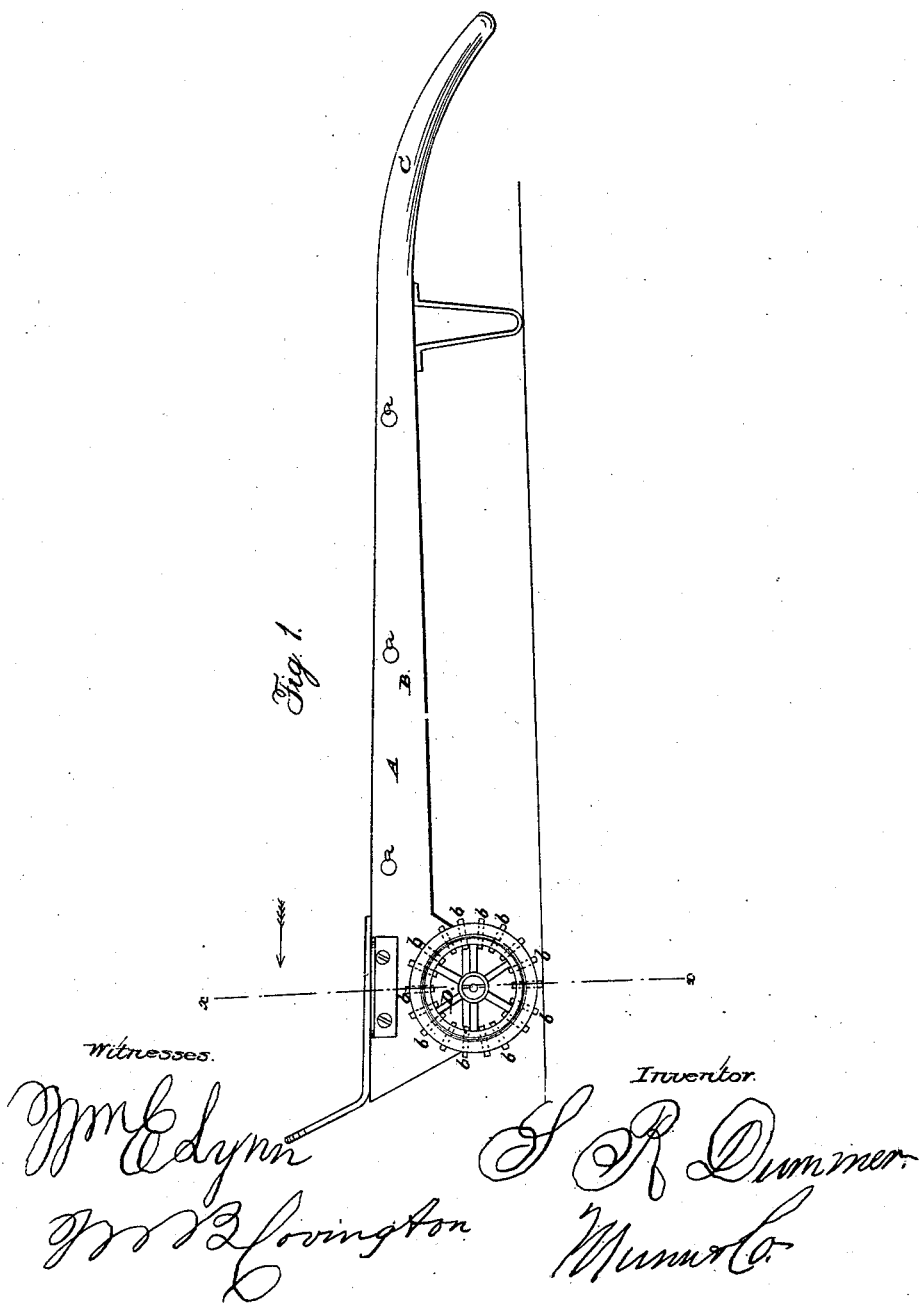

S. R. DUMMER.
Hand-Truck.

No. 57,487.

2 Sheets—Sheet 1.

Patented Aug. 28, 1866.

S. R. DUMMER.
Hand-Truck.
No. 57,487.
2 Sheets—Sheet 2.
Patented Aug. 28, 1866.
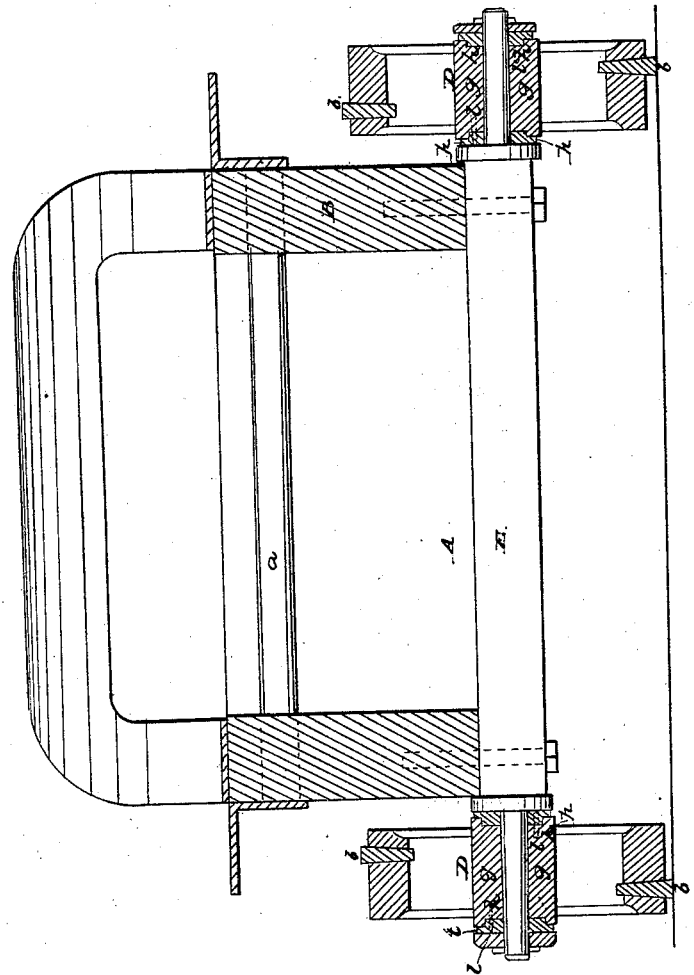

UNITED STATES PATENT OFFICE.

SAML. R. DUMMER, OF NEW YORK, N. Y.

IMPROVEMENT IN HAND-TRUCKS.

Specification forming part of Letters Patent No. 57,487, dated August 28, 1866; antedated August 17, 1866.

*To all whom it may concern:*

Be it known that I, SAMUEL R. DUMMER, of the city, county, and State of New York, have invented new and useful Improvements in Hand-Trucks; and I do hereby declare that the following is a full, clear, and exact description thereof, which will enable those skilled in the art to make and use the same, reference being had to the accompanying drawings, forming part of this specification.

The present invention relates to the hand-trucks used in warehouses, stores, and other similar places for the carrying of heavy wares and merchandise, and it has for its principal object (which is satisfactorily secured thereby) the prevention of the rumbling and other disagreeable noises now occasioned by them, as heretofore made, when drawn or pushed along over the floor of the store or warehouse; the invention consisting, first, in inserting within the periphery of the wheels of the truck, and so as to project therefrom, a series of elastic or flexible studs or knobs, made of india-rubber or gutta-percha, or of any of their respective elastic compounds, or of any other suitable elastic or flexible material, which studs form the bearing-surface of the said wheels upon the floor or other surface upon which they may roll, thereby relieving them from all the disagreeable and annoying noise heretofore occasioned by them when the truck was used; and, second, in the employment of elastic or flexible washers upon each side of the wheel-hubs, which washers are secured to the same so as to turn with the wheels, whereby no noise is occasioned by the wabbling or lateral play of the wheels upon their axle-shafts.

In accompanying plate of drawings my improvements in hand-trucks are illustrated, Figure 1 being a side elevation of the truck with them applied thereto, and Fig. 2 a transverse vertical section of the truck, taken in the plane of the line $x\,x$, Fig. 1, but on a scale much enlarged therefrom.

A in the drawings represents the frame of the truck, which is made of the usual form and style, it consisting of two side pieces, B B, secured together by cross bars or braces $a\,a\,a$ at suitable points, and terminating at one end with handles C, the other ends being supported upon wheels D D of a transverse axle-shaft, F, of the truck.

In and projecting from the periphery of each of these wheels, and either extending entirely through them or not, are inserted a series of elastic studs, $b\,b\,b$, of any desired number and at any distances apart, the projecting ends of which studs from the periphery of the wheel form the bearing-surface thereof. These studs may be secured in the wheels in any proper manner by the use of cement, if necessary, or by simply forming the apertures therefor in the wheels and the studs in such a manner with regard thereto that when they are placed in the apertures they will be held with sufficient tightness to prevent them from escaping or working out by the use of the truck.

By thus forming the bearing-surfaces or peripheries of the wheels with a series of elastic studs, as explained, it is obvious that when the truck is drawn or pushed along the floor or any other surface no rumbling noise will be occasioned thereby, as now occurs with the ordinary trucks, the advantages of which are many and apparent.

These elastic studs inserted in the truck-wheels may be made of india-rubber or gutta-percha, or of any of their respective elastic compounds, or may be made of any other suitable elastic material or materials, and therefore I do not intend to limit myself to the use of any one particular material or materials; and to still further lessen the noise now occasioned by the ordinary trucks when used, in addition to the above-explained construction of their wheel-peripheries with a series of elastic studs or knobs, I attach to each end of the hub $g$ of the wheels an elastic washer or ring, $h$, made either of india-rubber or gutta-percha, or of any of their respective elastic compounds, or any other suitable elastic or flexible material, which washers are countersunk in the hub and project a little beyond the same, forming elastic cushions, as it were, to the wheel-hub, which bear against the shoulder of the axle upon one side of the hub and against the nut or collar or other device upon the outer end of the axle-arm, used for holding the wheels thereon, whereby the wabbling noise occasioned by the lateral play of the wheels upon their axles is entirely obviated, the said washers being secured by pins $l\ l$, or in any other proper manner, to the said wheels, so as to turn with the same.

Although I have herein described my improvements as applied to a hand-truck such as is commonly used in warehouses, stores, &c., they can be as well applied to the trucks used in railroad-depots for the carriage of trunks and other similar articles, whether having two or four wheels, and therefore I do not intend to limit myself to their application to any one particular kind of hand-truck, but intend to apply them to all trucks or other similar devices which, when used, are drawn over smooth or even surfaces or floors.

I claim as new and desire to secure by Letters Patent—

1. The combination of the elastic studs $b$ and wheels D, constructed and arranged in the manner and for the purpose herein specified.

2. The combination of the flexible washers $h$ and hubs $g$, arranged in the manner and for the purpose herein specified.

The above specification of my invention signed by me this 13th day of November, 1865.

SAML. R. DUMMER.

Witnesses:
. M. M. LIVINGSTON,
ALBERT W. BROWN.